(12) United States Patent
Johnson et al.

(10) Patent No.: US 7,814,643 B2
(45) Date of Patent: Oct. 19, 2010

(54) METHOD FOR REDUCING OFF-TRACK GAIN FOR A DISK DRIVE ACTUATOR

(75) Inventors: Brad Vaughn Johnson, Santa Clara, CA (US); Daniel R. Stacer, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 713 days.

(21) Appl. No.: 11/750,639

(22) Filed: May 18, 2007

(65) Prior Publication Data

US 2008/0106822 A1 May 8, 2008

Related U.S. Application Data

(62) Division of application No. 10/881,164, filed on Jun. 30, 2004, now Pat. No. 7,239,486.

(51) Int. Cl.
*G11B 5/48* (2006.01)
(52) U.S. Cl. ............... 29/603.03; 29/603.04; 360/294.5
(58) Field of Classification Search .............. 29/603.03, 29/603.04, 603.05, 603.23; 360/264.7, 266, 360/265.7, 265.8, 294.3, 294.5
See application file for complete search history.

(56) References Cited

U.S. PATENT DOCUMENTS

| 5,027,241 | A | 6/1991 | Hatch et al. |
|---|---|---|---|
| 5,764,441 | A | 6/1998 | Aruga et al. |
| 5,905,608 | A | 5/1999 | Frees et al. |
| 5,936,808 | A | 8/1999 | Huang et al. |
| 5,953,180 | A | 9/1999 | Frater et al. |
| 5,973,421 | A | 10/1999 | Iwabuchi |
| 6,034,834 | A | 3/2000 | Yoshikawa et al. |
| 6,104,581 | A | 8/2000 | Huang et al. |
| 6,157,521 | A * | 12/2000 | Utsunomiya ............. 360/294.5 |
| 6,310,749 | B1 | 10/2001 | Beatty et al. |
| 6,538,853 | B1 | 3/2003 | Williams et al. |
| 2003/0053261 | A1 | 3/2003 | Thia et al. |
| 2003/0081355 | A1 | 5/2003 | Arisaka et al. |
| 2003/0081356 | A1 | 5/2003 | Shimizu et al. |

(Continued)

FOREIGN PATENT DOCUMENTS

JP 60077662 5/1985

(Continued)

OTHER PUBLICATIONS

J.S. Heath, "Design of a Swinging Arm Actuator for a Disk File", IBM J. Res. Dev., Jul. 1976, pp. 389ff.

*Primary Examiner*—A. Dexter Tugbang

(57) ABSTRACT

A method of redefining nodal points of rotation comprises providing an actuator assembly with a comb, a pivot having an axis of rotation, comb legs on one side of the pivot, a voice coil motor, an arm, and a head gimbal assembly mounted to the arm with a head opposite the arm; defining a first nodal point of rotation for the actuator at a position that is on the arm between the pivot and the head; defining a second nodal point of rotation for the actuator at a position adjacent to the pivot and the coil; moving the first nodal point in a radial direction away from the axis toward the head; and moving the second nodal point in a radial direction away from the pivot to a geometric center of active legs of the coil.

3 Claims, 3 Drawing Sheets

U.S. PATENT DOCUMENTS

2003/0090838 A1 5/2003 Pottebaum et al.
2003/0218833 A1 11/2003 Nagahiro et al.

FOREIGN PATENT DOCUMENTS

| JP | 2055558 | | 2/1990 |
| JP | 4216376 | | 8/1992 |
| JP | 6251518 | | 9/1994 |
| JP | 2000182344 A | * | 6/2000 |
| JP | 2003092862 | | 3/2003 |

* cited by examiner

METHOD FOR REDUCING OFF-TRACK GAIN FOR A DISK DRIVE ACTUATOR

This application is a division of U.S. patent application Ser. No. 10/881,164, filed Jun. 30, 2004, now U.S. Pat. No. 7,239,486, issued Jul. 3, 2007, and is incorporated herein by reference.

BACKGROUND OF THE INVENTION

1. Technical Field

The present invention relates in general to improved performance for a disk drive actuator and, in particular, to an improved system, method, and apparatus for reducing off-track gain for the second primary resonance of a disk drive actuator in the off-track direction.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm). Hard disk drives have several different typical standard sizes or formats, including server, desktop, mobile (2.5 and 1.8 inches) and microdrive.

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having a rotary pivotal bearing system.

The head and arm assembly is pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The motor used to rotate the disk is typically a brushless DC motor. The disk is mounted and clamped to a hub of the motor. The hub provides a disk mounting surface and a means to attach an additional part or parts to clamp the disk to the hub. In most typical motor configurations of HDDs, the rotating part of the motor (the rotor) is attached to or is an integral part of the hub. The rotor includes a ring-shaped magnet with alternating north/south poles arranged radially and a ferrous metal backing. The magnet interacts with the motor's stator by means of magnetic forces. Magnetic fields and resulting magnetic forces are induced via the electric current in the coiled wire of the motor stator. The ferrous metal backing of the rotor acts as a magnetic return path. For smooth and proper operation of the motor, the rotor magnet magnetic pole pattern should not be substantially altered after it is magnetically charged during the motor's manufacturing process.

The storage capacity of HDD's continues to increase at a dramatic pace. Increasing the track density on the disk surface is a key method of achieving this, and it is expected that this trend will continue in the future. In order to support increases in track density, the mechanical bandwidth of the HDD's actuator system must be continually improved. This means that the inherent mechanical resonances present in actuator structures, which create off-track disturbances, must be continually increased in frequency, reduced in amplitude, or completely eliminated. There is a need for a solution that will reduce off-track gain for the second primary resonance of an HDD actuator in the off-track direction.

One of the key technologies commonly proposed for very high track density HDD's is the use of two-stage actuators. This technology splits the traditional single stage actuator in use today into two devices, one of which can be very small and light. The second stage of a two-stage actuator can achieve very high mechanical bandwidths, thereby supporting high track densities. Unfortunately, the implementation of two-stage actuators significantly increases system cost. The component count is typically more than doubled when two-stage actuators are used in disk drives. Moreover, the complexity of controlling a two-stage system increases significantly as well. This leads to reductions in system reliability and production yields. Thus, an improved solution that reduces off-track gain for the second primary resonance of an HDD actuator in the off-track direction is needed.

SUMMARY OF THE INVENTION

One embodiment of a system, method, and apparatus for a disk drive actuator with improved dynamics is disclosed. The dynamics of the actuator are enhanced by redistributing the mass and stiffness of the structure. In one version, this is accomplished by relocating the two nodal points of the second primary bending mode of the actuator at specific positions. One nodal point is positioned as close to the read-write head as possible at one end of the actuator, and the other nodal point is positioned at the center of the active legs of the VCM coil at the other end of the actuator. This is done to reduce the off-track displacement associated with this fundamental resonance to near zero, allowing higher track densities to be supported. This solution has the added advantage of having low sensitivity to the variations in actuator fabrication that occur in high volume production. Since nodes are positioned at the input and output ends for the device, they tend to cancel each other when random variations in the construction of the actuator occur.

One of the advantages of this solution is that no increases in cost or complexity are associated with its implementation. The design of existing actuator systems is carefully re-configured to manipulate the mode shape in a manner that reduces off-track amplitude. In one example, the VCM coil of an actuator was purposely lengthened several millimeters to move the nodal point of rotation from a position near the actuator pivot to a position exactly in the center of the active legs of the coil. Now, forces induced on the coil legs by the VCM during seek events impart no vibration on the structure. To keep the actuator balanced about it's pivot axis, a fundamental requirement for maximum operational shock capability, an axial dimension of the coil was reduced to maintain the original mass.

At the recording head end of the actuator, the mount plates of the suspension system were increased in axial thickness by about 25%. This modification moved the point of rotation for the nodal point on the head side of the actuator toward the recording head by several millimeters, which also reduces the off-track amplitude. Ideally, the point of rotation is positioned exactly at the read/write head, but in practice this is not possible without positioning mass beyond the read/write head. Such a solution is undesirable in most cases due to packing constraints.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
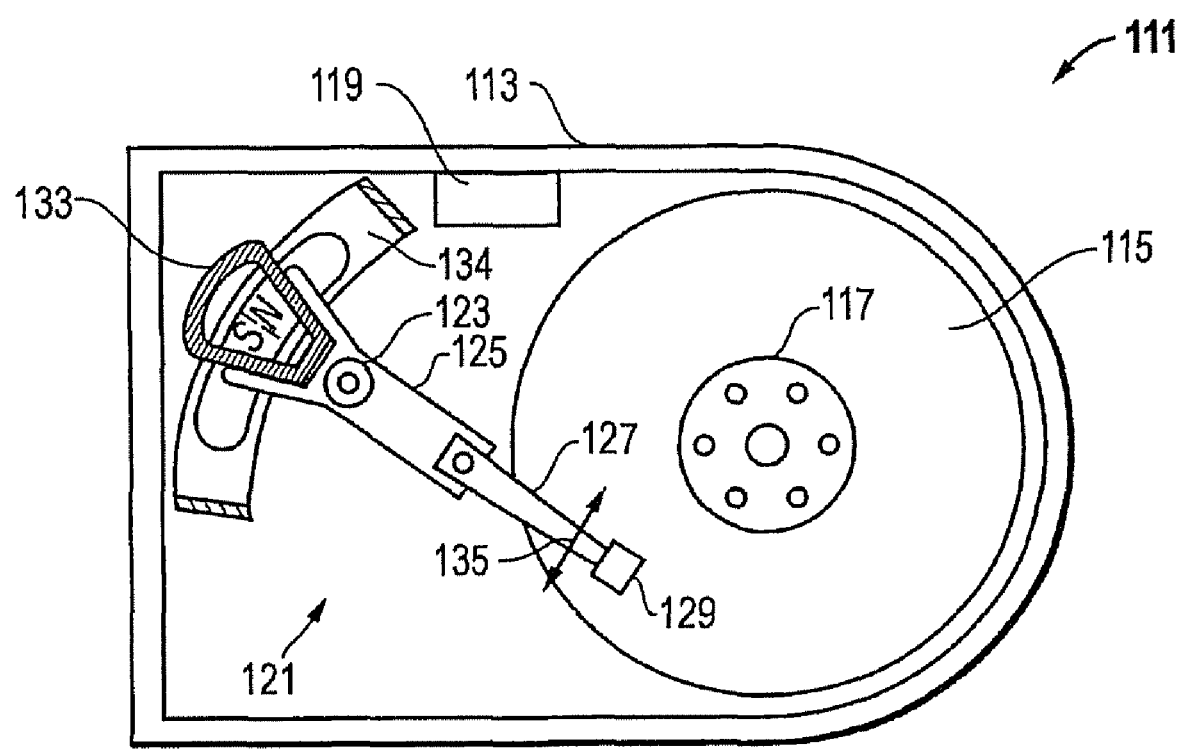
FIG. 1 is a plan view of a disk drive constructed in accordance with the present invention.

Referring to FIG. 1, a schematic drawing of one embodiment of an information storage system comprising a magnetic hard disk file or drive 111 for a computer system is shown. Drive 111 has an outer housing or base 113 containing at least one magnetic disk 115. Disk 115 is rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be femto size (approximately 850×700× 230 microns) and is pre-loaded against the surface of disk 115 (in the range two to ten grams) by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 2:
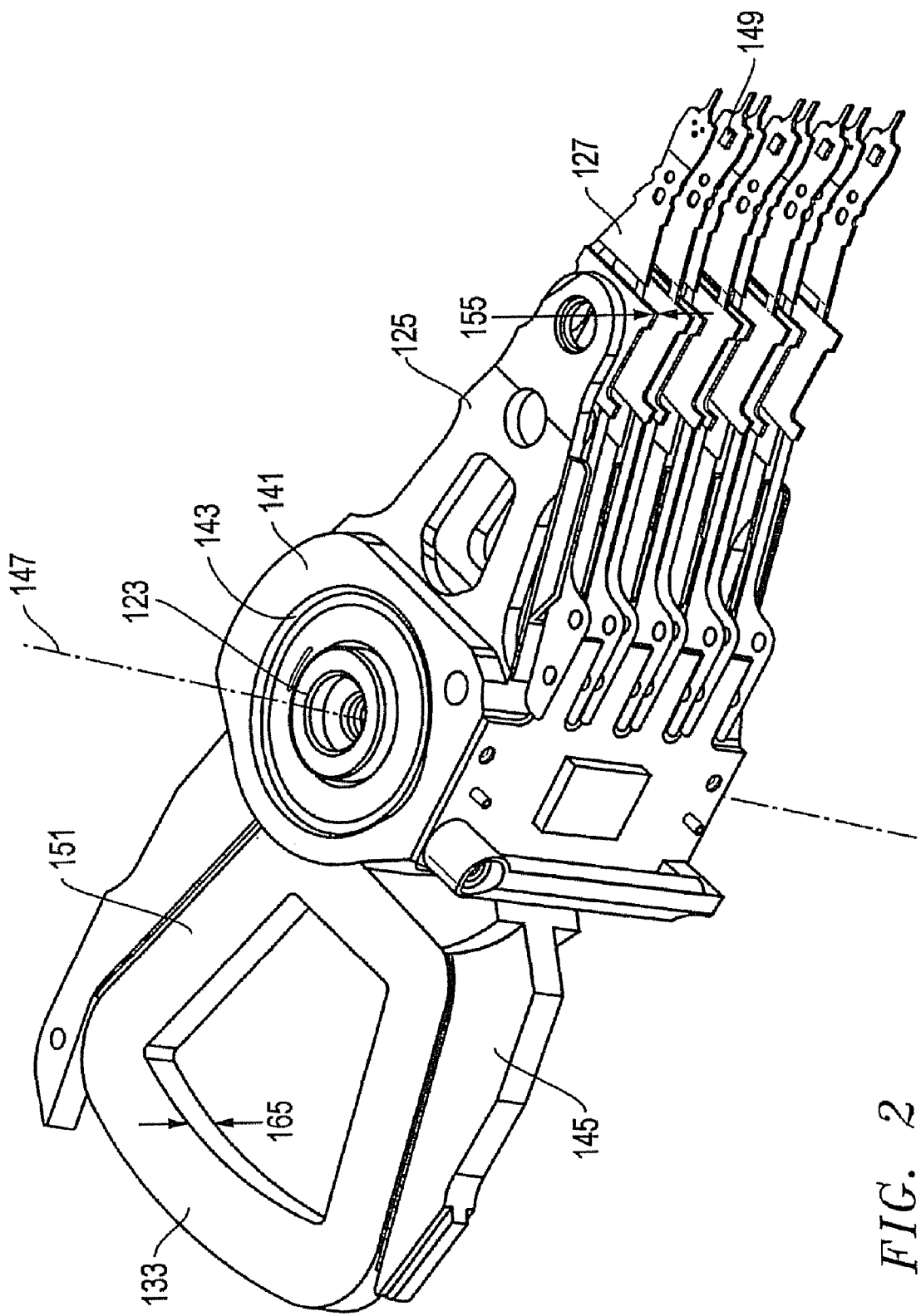
FIG. 2 is an isometric view of an actuator for the disk drive of FIG. 1 and is constructed in accordance with the present invention.
Figure 3:
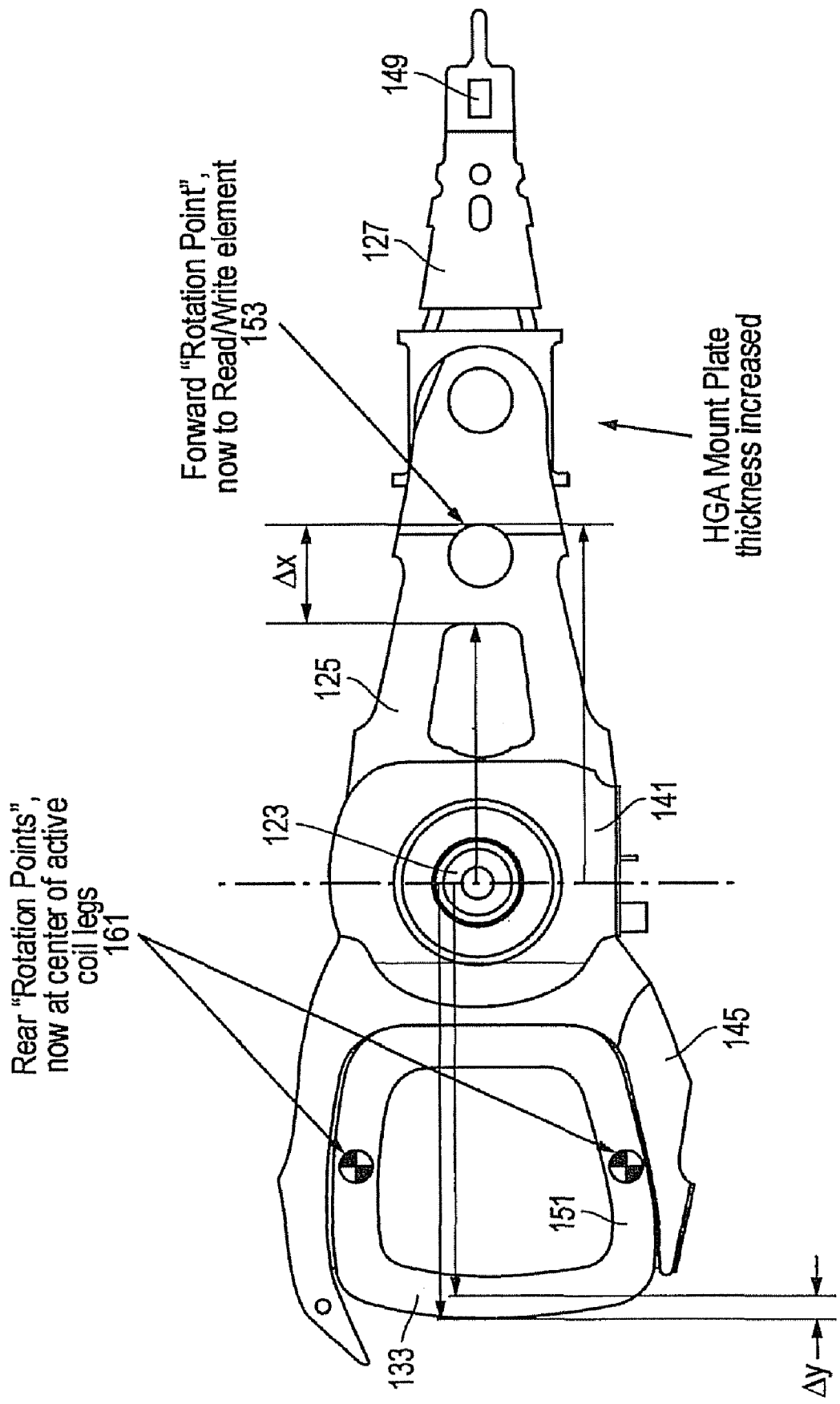
FIG. 3 is a plan view of the actuator of FIG. 2 and is constructed in accordance with the present invention.

Referring now to FIGS. 2 and 3, details regarding the design and features of the actuator 121 are shown. The actuator 121 includes a comb 141 having a pivot bore 143, a set of comb legs 145 (two shown) extending from the comb 141 on one side of the pivot bore 143, and an arm 125 (several shown) extending from the comb 141 opposite the active legs 145. The pivot 123 is mounted in the pivot bore 143 of the comb 141 and has an axis 147 of rotation. At least one head gimbal assembly 127 is mounted to each arm 124 of the comb 141 and has a read/write head 149.

The coil 133 for the voice coil motor is mounted to the comb 141 between the comb legs 145. The coil 133 has a set of active legs 151 (two shown) that extend radially relative to axis 147. As shown in FIG. 3, a first nodal point 153 of rotation of a second primary bending mode of the disk drive actuator assembly is positioned further away ($\Delta x$) from axis 147, which is further adjacent the read/write head 149. The first nodal point 153 is positioned as close to the read/write head 149 as possible to reduce vibration at the second primary bending mode. One way to accomplish this objective is to increase an axial thickness 155 (FIG. 2) of the mount plate of the head gimbal assembly 127 by about 25% over the nominal design to position the first nodal point 153 away from the axis several millimeters further toward the read/write head 149.

Referring again to FIG. 3, a second nodal point 161 of rotation of the second primary bending mode is positioned at a geometric center of the active legs 145 of the coil 133. In this way, the first and second nodal points 153, 161 reduce off-track gain for the second primary bending mode in an off-track direction. In one version, this may be accomplished, relative to the pivot axis 147, by reducing an axial thickness 165 (FIG. 2) of the coil 133, and increasing a radial length 167 of the coil 133 ($\Delta y$) to position the second nodal point 161 away from the axis 147 by several millimeters to the geometric center of the active legs of the coil 133.

One embodiment of the present invention also comprises a method of redefining the nodal points of rotation in a disk drive actuator assembly to improve the dynamics thereof. The method comprises providing an actuator assembly 121 with a comb 141, a pivot 123 mounted in the comb 141 having an axis 147 of rotation, comb legs 145 extending from the comb 141 on one side of the pivot 123. The actuator assembly 121 also has a coil 133 of a voice coil motor mounted thereto, an arm 125 extending from the comb 141 opposite the comb legs 145, and a head gimbal assembly 127 mounted to the arm 125 and having a read/write head 149 opposite the arm 125.

The method further comprises defining a first nodal point 153 of rotation for the actuator assembly 121 at a position that is on the arm 125 between the pivot 123 and the read/write head 149; defining a second nodal point 161 of rotation for the actuator assembly 121 at a position that is adjacent to the pivot 123 and the coil 133; moving the first nodal point 153 in a radial direction away from the pivot axis 147 toward the read/write head 149; and moving the second nodal point 161 in a radial direction away from the pivot axis 147 to a geometric center of the active legs 151 of the coil 133, such that the moved first and second nodal points 153, 161 reduce vibration when operational forces are imparted on the actuator assembly 121 by the voice coil motor during seek events to reduce off-track amplitude of the read/write head 149.

The method may comprise increasing an axial thickness 155 of the head gimbal assembly to move the first nodal point 153 several millimeters ($\Delta x$) toward the read/write head 149. In addition, the method may comprise lengthening the coil 133 several millimeters ($\Delta y$) in a radial direction and reducing an axial thickness 165 of the coil 133 to reduce its mass.

The present invention has several advantages, including the ability to improve the dynamics of disk drive actuators. The solution presented has low sensitivity to the variations in actuator fabrication that occur in high volume production. The nodes are positioned at the input and output ends of the device and tend to cancel each other when random variations in the construction of the actuator occur. In addition, there are no increases in cost or complexity are associated with its implementation. The design of existing actuator systems is carefully re-configured to manipulate the mode shape in a manner that reduces off-track amplitude.

While the invention has been shown or described in only some of its forms, it should be apparent to those skilled in the art that it is not so limited, but is susceptible to various changes without departing from the scope of the invention.

What is claimed is:

1. A method of redefining nodal points of rotation in a disk drive actuator assembly to improve dynamics thereof, the method comprising:
    (a) providing an actuator assembly with a comb, a pivot mounted in the comb having an axis of rotation, comb legs extending from the comb on one side of the pivot and having a coil of a voice coil motor mounted thereto, an arm extending from the comb opposite the comb legs, and a head gimbal assembly mounted to the arm and having a read/write head opposite the arm;
    (b) defining a first nodal point of rotation for the actuator assembly at a position that is on the arm between the pivot and the read/write head;
    (c) defining a second nodal point of rotation for the actuator assembly at a position that is adjacent to the pivot and the coil;
    (d) moving the first nodal point in a radial direction away from the pivot axis toward the read/write head; and
    (e) moving the second nodal point in a radial direction away from the pivot axis to a geometric center of active legs of the coil, such that the moved first and second nodal points reduce vibration when operational forces are imparted on the actuator assembly by the voice coil motor during seek events to reduce off-track amplitude of the read/write head.

2. The method of claim 1, wherein step (d) comprises increasing an axial thickness of the head gimbal assembly to move the first nodal point several millimeters toward the read/write head.

3. The method of claim 1, wherein step (e) comprises lengthening the coil several millimeters in a radial direction and reducing an axial thickness of the coil to reduce its mass.

* * * * *